July 30, 1968  W. E. BELL ETAL  3,395,367
SYSTEM FOR STABILIZING THE AMPLITUDE OF A LASER OUTPUT
Filed Oct. 9, 1963  3 Sheets-Sheet 1

WILLIAM E. BELL
PAUL H. LEE
INVENTORS

BY

ATTORNEYS

July 30, 1968 W. E. BELL ETAL 3,395,367
SYSTEM FOR STABILIZING THE AMPLITUDE OF A LASER OUTPUT
Filed Oct. 9, 1963 3 Sheets-Sheet 2

INVENTORS
WILLIAM E. BELL
PAUL H. LEE
BY
ATTORNEYS

WILLIAM E. BELL
PAUL H. LEE
INVENTORS

United States Patent Office 3,395,367
Patented July 30, 1968

3,395,367
SYSTEM FOR STABILIZING THE AMPLITUDE OF A LASER OUTPUT
William E. Bell, Palo Alto, Calif., and Paul H. Lee, Westport, Conn.; said Bell assignor to Spectra-Physics, Inc., Mountain View, Calif., a corporation of California, and said Lee assignor to The Perkin-Elmer Corporation, Norwalk, Conn., a corporation of New York
Filed Oct. 9, 1963, Ser. No. 314,958
5 Claims. (Cl. 331—94.5)

ABSTRACT OF THE DISCLOSURE

A stabilizer maser system in which a population inversion is established between two energy levels of an active medium to generate a master output at a frequency corresponding to the transition between these two energy levels. The active medium is additionally irradiated by control radiation at a frequency effective to induce transitions between one of these energy levels and a third energy level of the active medium. Variations in the maser output intensity are detected and used to vary the intensity of the control radiation, thereby varying the population inversion between the two maser energy levels and maintaining the intensity of maser output radiation constant. In the described examples, the detected output is generated by a first helium-neon optical maser operating at one wavelength and the control radiation is generated by a second helium-neon optical maser operating at a second wavelength. The use of this stabilization system in a ring-resonator, rotation sensor is also described.

---

This invention relates generally to a maser system and method and more particularly to a maser system which emits continuous energy at substantially constant intensity.

As is known, a maser includes an active element in which the atoms can be excited to a plurality of energy levels. Means are provided in conjunction with the material for exciting the atoms so that they populate the various energy levels. Atoms at the higher energy levels undergo transitions to lower elevels. During these transitions, electromagnetic energy of a frequency characteristic of the energy difference between the particular energy levels is emitted.

One such maser system is the optical maser (often referred to as laser) which contains a gaseous mixture of neon and helium gases. Population inversion between atomic states of the neon is obtained by an electrical gas discharge of sufficient level to sustain continuous operation. An optical high-Q cavity resonator is formed by highly reflective dielectric multi-layer reflectors mounted outside of the tube which contains the gas mixture.

The simplified energy diagram shown in FIGURE 4 illustrates the step by step atomic processes involved in producing the emission from a helium-neon laser.

As a particular example, the process will be followed for emission of energy at 6328 angstroms, it being apparent that energy at other frequencies is generated in a similar manner.

The helium atoms are raised to the metastable excited state 20.61 electron volts above the ground state by means of the electrodeless RF discharge. Nearly coincident in energy is the $3s_2$ state of the neon, 20.66 electron volts above the neon ground state. Energy exchange collisions occur between the excited helium atoms and the ground state neon atoms through which the neon atoms are raised to the excited $3s_2$ state and the helium atoms returned to the ground state with the small difference in energy taken up by thermal motion. This action leads to a preferential population of the neon $3s_2$ level relative to the $2p_4$ level, and the atomic system, then, assumes the characteristics of negative resistance or gain at the transition wavelength of 6328 angstroms. A neon atom undergoing the transition from the $3s_2$ level to the $2p_4$ level will emit a photon having an energy of 6328 angstroms. This photon can be pictured as an electromagnetic wave travelling down the axis of the optical resonator and being reflected back from the resonator reflector surfaces. If the gain in energy per round trip through the resonator is greater than the loss in energy in reflecting from the surfaces, the wave will be reinforced and oscillations will occur.

Gain is achieved by virtue of the process of stimulated emission whereby one photon can induce other excited neon atoms in its path to radiate, in phase, photons of the same wavelength. The output from the laser consists of a small amount of coherent energy transmitted through the reflective resonator surfaces.

After having been stimulated to emit the 6328 angstrom energy, the neon atoms undergo a normal relaxation from the $2p_4$ level to the neon ground state where they are again excited through collisions with the continuously excited helium atoms, thereby making this cycle and the resultant coherent output a stable and continuous one.

Although an optical maser of the type described gives continuous optical radiation, the intensity of the radiation may vary because of variations in electrical excitation and other phenomena which may be taking place within the tube and resonant cavity. In many applications, such variations are unimportant. In other applications, such as where a laser is employed in a system or sensing angular rotation based on the Michelson-Gale effect, it is desirable to have the emission from the maser be of substantially constant amplitude.

It is a general object of the present invention to provide a maser system and method for emitting electromagnetic energy of relatively constant amplitude.

It is another object of the present invention to provide a system and method in which the amplitude of energy emitted at one wavelength from the maser is controlled by irradiating the maser with radiation of another frequency and controlling the intensity of said irradiation in response to the amplitude of the emitted energy.

It is another object of the present invention to provide a maser system and method in which the electromagnetic energy emitted at one frequency from a system utilizing two atomic energy levels is controlled by inducing by irradiation at a second frequency transitions from one of said energy levels to a third level of the atomic system to alter the population difference between the two energy levels to control the plasma gain and thus the amplitude of the emitted energy at said one frequency.

It is a further object of the present invention to provide a system of the above character employing a first and second optical maser, the first of which emits energy at the desired frequency and the second of which serves to irradiate the other at another frequency which can induce transitions in the first optical maser and controlling the intensity of the irradiation from the second optical maser in response to the intensity of the energy emitted from the first maser.

It is a further object of the present invention to provide an improved system for sensing angular rotation employing one or more lasers stabilized in accordance with the present invention.

These and other objects of the invention will become more clearly apparent from the following description taken in conjunction with the accompanying drawing.

Referring to the drawing.

Figure 1:
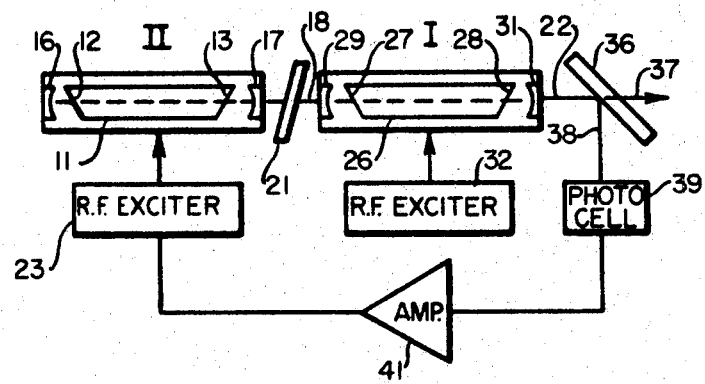
FIGURE 1 shows one embodiment of a maser system in accordance with the present invention.

Referring to FIGURE 1, there is shown a maser system utilizing quantum conversion for controlling the intensity of the emission from a first optical maser I responsive to impinging radiation from a second optical maser II. The second optical maser includes a glass envelope 11 filled with a mixture of helium and neon gases at suitable pressure, for example, 1.5 torr. Transparent windows 12 and 13, for example, quartz windows, are sealed to the ends of the tubular envelope and positioned at an angle with respect to the axis of the envelope so as to minimize losses due to reflections from the surfaces of the window. Exterior of the envelope and adjacent the windows 12 and 13 are two highly reflective reflectors 16 and 17, such as multi-layered dielectric reflectors, which, in accordance with well known principles, serve to selectively reflect energy to set up standing waves within the gaseous mixture. The standing waves are amplified or increased by the energy released as the atoms in an inverted energy state fall from an upper energy level to a lower energy level which defines a transition characterizing a particular wavelength.

The reflector 17 is selected to be slightly less than completely reflective, for example, 99 percent reflective, whereby useful coherent output energy 18 is emitted or radiated. This energy is shown in FIGURE 1 as being projected towards the filter 21 which may be provided to filter out any energy at unwanted wavelengths. The transmitted energy is then applied to the first laser which emits the useful output energy designated generally by the arrows 22.

The helium-neon mixture within the tube 11 is electrically excited, as by an RF exciter 23, which may comprise a conventional RF transmitter.

The first laser which provides the useful output energy 22 is constructed in the same manner as the second laser. It includes a tubular envelope 26 which is filled with a gaseous mixture, such as a helium-neon mixture. It includes windows 27 and 28. High reflecting, multi-layered reflectors 29 and 31 are disposed outside the envelope and adjacent the windows for setting up standing waves within the envelope. The maser is excited by a variable RF exciter 32.

The output 22 from the first laser is directed towards a partially transparent mirror 36 where a portion of the energy 37 is transmitted for use in associated equipment. A portion 38 of the energy is directed to a photocell 39. The output from this photocell may be applied to an amplifier 41 and then applied to control the output power from the RF exciter 23. For example, the signal from the amplifier 41 may be applied to control the screen voltages of the vacuum tubes in the final stages of the RF exciter, or may be used in other manners to control or vary the output from the RF exciter whereby the excitation of the second laser can be controlled to thereby control the amount of energy emitted.

Assume that the first laser is lasing at the wavelength of 6328 angstroms. The transitions take place between the $3s_2$ state and the $2p_4$ state of the atoms, FIGURE 4. Energy at 6328 angstroms is detected by the photocell 39 which provides a signal to the amplifier 41. The output of the amplifier 41 varies in accordance with the intensity of the beam 38 impinging upon the photocell. The output from the amplifier is applied to the exciter 23 to control its output. Assume that the second laser is operating at the transition between the $3s_2$ and $2p_4$ energy levels to emit at the wavelength of 33,912 angstroms. The output of this laser is, as previously described, applied to the filter 21 which will filter out any visible radiation and the first laser is irradiated with the 33,912 angstrom (infrared) energy.

The infrared energy from the second laser induces transitions in the first laser between the $3s_2$ and $3p_4$ energy levels. This reduces the population at the $3s_2$ level available for transition to the $2p_4$ level. on a quantum basis, this reduces the intensity of the emitted energy at 6328 angstroms. This reduction is detected by the photocell which provides its output to the amplifier 41. If the system is so adjusted that an increase in intensity of radiation to the photocell serves to increase the excitation of the RF generator, then a closed loop negative feedback system is provided which serves to maintain the amplitude of the radiation 22 substantially constant at a value determined by the gain of the system. The quantum effect is essentially instantaneous so that the response time of the system (limited predominantly by the bandwidth of the optical resonators 29, 31) can be typically one microsecond or less.

To more clearly understand the foregoing, if the optical maser is operating in the transition between $3s_2$ and $2p_4$ states, optical maser action will take place when a $3s_2$ level has a greater population than the $2p_4$ level. The laser will oscillate at a frequency corresponding to the wavelength 6328 angstroms. For this particular atomic system, under normal conditions in helium-neon lasers, the $3s_2$ level also has a greater population than the $3p_4$ level with the wavelength of the transition being 33912 angstrom. When one considers the 33,912 angstrom radiation is supplied to a laser which is operating at the transition between the $3s_2$ and $2p_4$ level in the neon to emit 6328 angstroms energy, the infrared radiation (33,912 angstroms) will induce transitions between the $3s_2$ and $3p_4$ levels. Since there is a greater population at the $3s_2$ level than in the $3p_4$, the effect of this radiation will be to transfer population from the $3s_2$ to the $3p_4$ level. For each quantum of incident radiation which interacts with the neon atomic system, one neon atom will be removed from the $3s_2$ level and transferred to the $3p_4$ level. This atom is then unavailable for the $3s_2$ to $2p_4$ laser transition. Thus, one quantum of energy is removed from the 6328 angstrom radiation. By this means, an essentially unity-quantum efficiency exists for the conversion of one quantum at 33,912 angstrom radiation to an absence of one quantum of energy at 6328 angstroms. Conversely, when the laser is oscillating at the 33,912 angstrom transition, the incidence of a 6328 angstrom quantum will remove one quantum of the 33,912 angstrom radiation.

In this same system, the $2s_2$ level is more heavily populated than the $2p_4$ level with the wavelength of the transition being 11,532 angstroms. If the optical maser is operating at 6328 angstroms and is irradiated with 11,532 angstrom wavelength radiation, for each quantum of the 11,532 angstrom radiation which interacts with the active element, one neon atom will be transferred from the $2s_2$ level to the $2p_4$ level. This again will have the effect of removing one quantum of radiant energy from the 6328 angstrom output because it reduces the net difference of population between the upper $3s_2$ level and the lower $2p_4$ level.

The foregoing are specific examples of an optical maser including helium-neon mixture and operating between the specific energy levels $3s_2$, $3p_4$ and $2s_2$. However, it is apparent that the same principle may be generalized. Generally, the same quantum effect of changing the intensity of radiation is achieved in a maser by radiating the medium of the maser with radiation at a frequency within one line width of the transition frequency from either the upper or lower laser energy level to any other energy level of the same atomic system.

If the radiating wavelength corresponds to the transition between the upper energy level and a third level of the atomc or molecular system with a population less than the population of the upper energy level, then the effect of incident radiation will be to transfer energy from the upper energy level to the third level and cause a decrease in the population of the upper level. This is then reflected in a decrease in the population difference between the upper level and the lower level with which it is masing, thereby reducing the intensity of output radiation at the masing frequency or wavelength.

If the upper energy level has a population which is less than the third atomic or molecular energy level which has a transition with the upper level at the frequency of the radiating energy, then the incident energy will cause an increase in population of the upper energy level. This increase of population increases the population difference between the atoms in the upper level and the lower transition level to thereby increase the maser output.

If the radiating wavelength is such that it will cause transitions between the lower energy level and a third energy level having a higher population than the lower energy level, it will increase the net population of the lower energy level, decreasing the population difference between the upper level and lower level to decrease the radiation. On the other hand, if the third energy level has a population less than the population of the lower energy level, then incident radiation will cause a transfer of population from the lower level to the third level and thereby increase the net population difference between the upper level and the lower level to increase the intensity of the output radiation.

Figure 4:
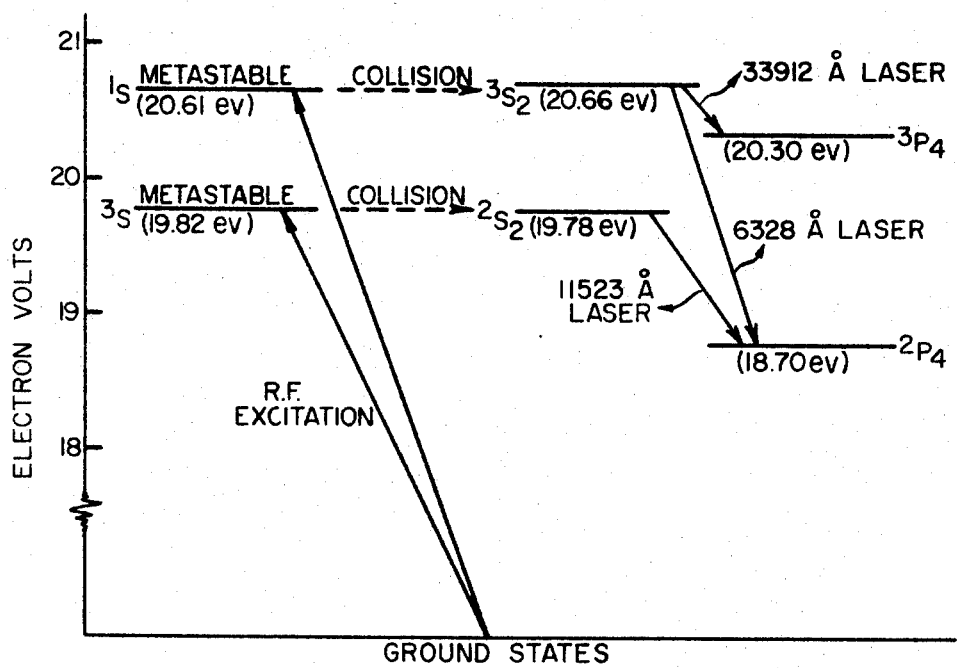
FIGURE 4 shows the energy level diagram for a helium-neon active mixture.

The foregoing is not limited to an optical maser which is masing at a single frequency but is also applicable to a maser that is masing at multiple frequencies such as the maser shown in the energy diagram of FIGURE 4 wherein the maser is masing between the level $3s_2$ and the levels $3p_4$ and $2p_4$ simultaneously to provide output radiation at two wavelengths, 6328 angstroms and 33,912 angstroms.

It is then seen that there is provided an optical maser having two masing frequencies with a common transition level. For example, the common transition level may be of the upper $3s_2$ state when the maser is operating 6328 angstroms and 33,912 angstroms, and the common state may be the lower $2p_4$ state when the laser is operating at the 6328 and 1153 angstroms.

By inducing a change in population in any one of the states, for example, causing transition between the respective state and another atomic state, the overall system balance may be changed. If the transition is caused when the optical maser is operating at 6328 angstroms and 33,912 angstroms simultaneously, then energy in the 6328 angstrom wavelength can be either decreased or increased in accordance with the intensity of oscillation in the 33,912 angstrom lasing oscillator because of the change in population of the $3s_2$ state.

It is seen that the phase of the feedback must be selected to correspond to the frequencies of operation of the first laser with respect to the second since, in certain conditions, the impinging radiation may increase the population difference to increase the intensity of the radiated energy while in other cases, it may decrease the population difference to decrease the intensity of the radiated energy.

Figure 2:
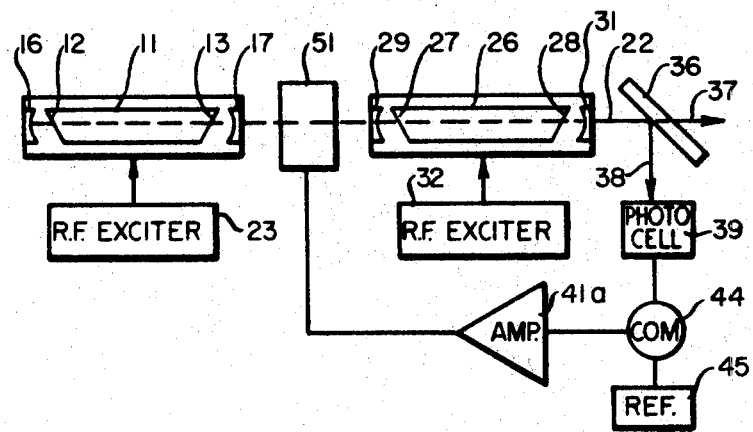
FIGURE 2 shows another maser system in accordance with the present invention.

Referring to FIGURE 2, a system similar to that of FIGURE 1 is shown. In the system of FIGURE 2, like reference numerals are applied to like parts. In this system, the output from the photocell is applied to a comparator 44 which has applied thereto a standard or reference signal from source 45. The difference is applied to the amplifier which is connected to drive a fast-response modulator 51 such as an electro-optic polarization rotator (for example, Pockels cell) or a magneto-optic polarization rotator (for example, Faraday cell). The intensity of the irradiation of the first laser is controlled by the modulator 51. The amount of energy transmitted from the second laser by the modulator is a function of the voltage applied thereto from the amplifier 41a. In other respects, the system operates in the manner previously described.

Figure 3:
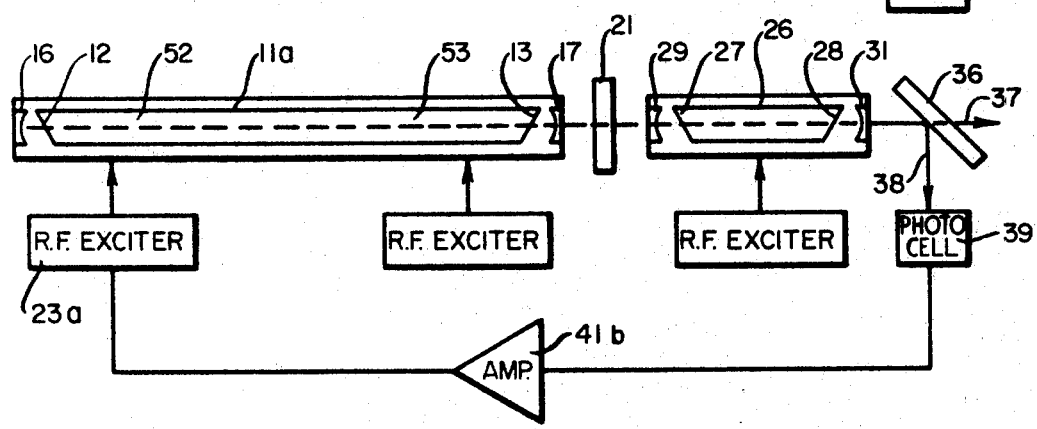
FIGURE 3 shows still another maser system in accordance with the present invention.

FIGURE 3 shows a system which employs a single tube 11a which supports two excited zones 52 and 53. Other reference numerals are the same as those used for like parts in FIGURE 1. Each zone acts as a laser in and of itself. The energy in one zone is directly coupled to the other and it is possible to obtain relative pure radiation from the combination by employing quantum conversion as previously described. The output of the double zoned laser is applied to the first laser and controls, through the feedback circuit, the intensity of the energy emitted therefrom by employing feedback to the exciter 23a.

The advantage of this system which, in effect, employs two control lasers, is that a finer control can be obtained. For example, if one of the two control lasers supplies 70 percent of the energy required, then variations of the intensity of the other over its full range of 0–100 percent changes the overall radiation only by 0–30 percent.

Although it is preferable to employ as the source of control radiation a laser because of its narrow bandwidth, it is apparent that other sources of radiation can be employed if they can provide radiation of sufficient intensity at the wavelength required to cause transitions.

Figure 5:
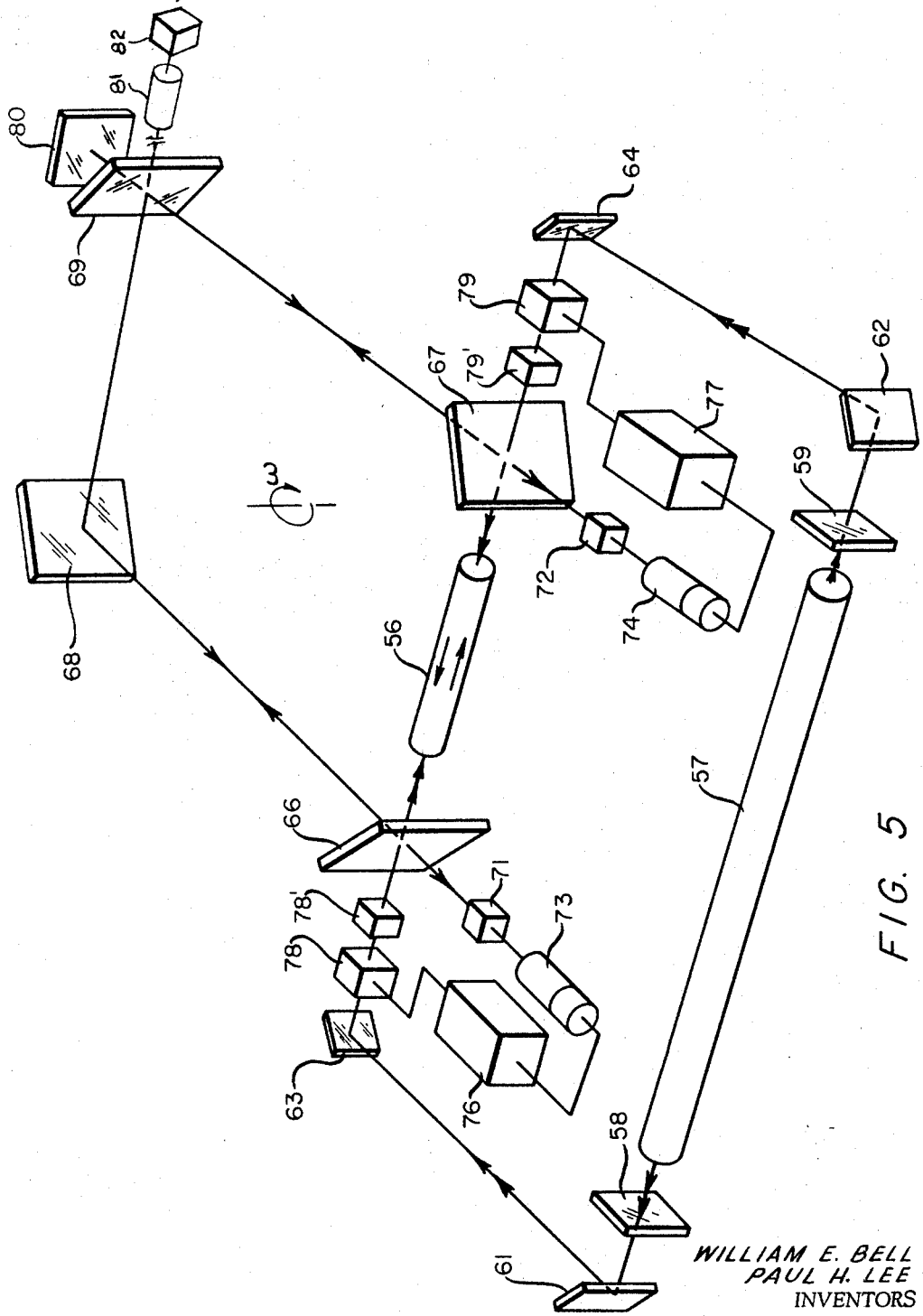
FIGURE 5 is a schematic diagram of a system for measuring rotation incorporating the present invention.

The Michelson-Gale experiments verified the fact that absolute rotation can be detected not only by mechanical means, but also by optical means. The electro-optical system shown in FIGURE 5 is a system for sensing angular rotation which employs an optical maser 56 as the light source. Said maser provides the clockwise and counterclockwise electromagnetic energy taken from the separate velocity groups of atoms when the maser is slightly detuned. The other optical maser 57 serves to stabilize or control the maser 56 separately and independently for the two populations feeding the clockwise and counterclockwise waves.

The control maser includes reflectors 58 and 59 disposed at opposite ends and serving to form the resonant cavity. Suitable mirrors 61 and 62 deflect the energy and cause the same to impinge on mirrors 63 and 64, respectively, which direct the radiation towards the optical maser 56. The energy from maser 57 is employed to control the intensity of radiation from the laser 56.

The independent control is achieved by separately controlling and transmitting the oppositely-directed competing illumination (double-head arrows) from each end of the modulated control maser 57 into the maser 56. In this manner, the populations feeding the clockwise and counterclockwise waves in the active maser medium 56 are separately controlled.

The output from the optical maser 56 (single-headed arrows) is reflected in a closed ring resonator path by angularly-disposed mirrors 66, 67, 68 and 69. The wave energy travelling counter-clockwise is directed via isolator 71 to photocell 73; and the wave energy travelling clockwise is directed via isolator 72 to photocell 74. The output of the photocells is applied to an electronic circuit such as an amplifier or an amplifier and a comparator circuit of the type previously described and herein numbered 76 and 77, respectively, and, in turn, is used to drive modulators 78 and 79, respectively, which serves to control the intensity of radiation impinging upon the maser 56 (via isolators 78' and 79'). As a result, the two waves from the optical maser 56 are cintrolled in amplitude. The system including the maser 56 is then employed to optically determine rotation.

If the system is undergoing a rotation of angular velocity $\omega$, say in the clockwise direction, the effective optical length of the ring resonator 66–68–69–67 of maser 56 is slightly greater for the clockwise wave than for the counterclockwise wave. Consequently, the optical oscillation frequency for the two waves is separated by an amount $\Delta\nu$ equal to $(4A/L\lambda)\omega$, where $A$ is the area enclosed by the ring resonator, $L$ is the stationary optical path length, and $\lambda$ is the stationary optical oscillation wavelength. Mirror 69 is made partially transparent to obtain a fractional output of the two waves. Back-up mirror 80 reflects the counterclockwise output wave back to mirror 69 so that it is superimposed on the clockwise output wave. The Michelson-Gale frequency shift $\Delta\nu$ may be detected by directing the combined radiation into a photocell 81, the non-linearity of the photosensitive surface giving rise to a beat frequency signal at $\Delta\nu$ which is coupled to a frequency-measuring receiver 82.

The independent amplitude stabilization of the counter-rotating waves, as described above, permits a more accurate and stable measurement of the frequency difference $\Delta\nu$. For example, this stabilization inhibits the tendency of the atomic population to shift to the stronger of the two rotating waves whereby the two oscillations can become phase-locked to one frequency.

Another advantage of amplitude stabilization in accordance with present invention results from the inhibition of frequency changes due to non-linear effects of wave amplitude changes in the active laser medium. This is particularly important in any application, including that shown in FIGURE 5, where the laser oscillation is used for purposes of wavelength or frequency measurement.

I claim:

1. A system including a first maser containing an active element having a plurality of energy levels, transitions between which characterize different frequencies of emitted energy, means for exciting said active element to establish at least two different population levels, transitions between which emit energy at a first frequency, a second maser containing an active substance including at least two energy levels, one of which corresponds to one of the transition energy levels of the first maser, means for exciting said second maser to establish population in said second maser energy levels whereby transitions between the same emit energy at a characteristic frequency, which is directed from the second maser into the first maser to alter the population in one of said two different population levels, by transitions to a third level, and means for controlling the intensity of the energy received by the first maser from the second maser in response to the intensity of radiated energy from the first maser to thereby maintain the intensity of radiation from the first maser substantially constant.

2. A system as in claim 1 in which said intensity control means includes means responsive to energy from the first maser serving to generate a control signal, and means responsive to said control signal for controlling the intensity of the radiation received by the first maser from the second maser.

3. A system as in claim 2 wherein said means responsive to said control signal comprises a polarization rotator serving to control the amount of energy passed therethrough from the second maser to the first.

4. A stabilized optical radiation system, comprising: a laser medium; means exciting a population inversion between a first energy level and second energy level of said laser medium for emitting output laser radiation at a frequency corresponding to a transition between said first and second energy levels; means for irradiating said laser medium with control radiation at a frequency effective to induce transitions between one of said energy levels and a third energy level of said laser medium; means for detecting variations in the intensity of said output laser radiation; and means responsive to said detecting means for varying the intensity of said control radiation in said laser medium to thereby vary the population inversion between said first and second energy levels and maintain the intensity of said output laser radiation constant.

5. A system according to claim 4 wherein said laser medium is a gaseous medium.

References Cited

UNITED STATES PATENTS 3,171,031   2/1965   Yariv _____ 331—94.5
3,242,440   3/1966   Koester et al. _____ 331—94.5

OTHER REFERENCES

Bloom et al.: "Laser Operation," Applied Optics, vol. 2, No. 3, March 1963, pp. 317–318.

JEWELL H. PEDERSEN, *Primary Examiner.*

E. S. BAUER, *Assistant Examiner.*